July 9, 1940.                F. McCARROLL                2,206,910
                       HEAVY LOAD PARACHUTE DEVICE
                          Filed June 5, 1939                2 Sheets-Sheet 1
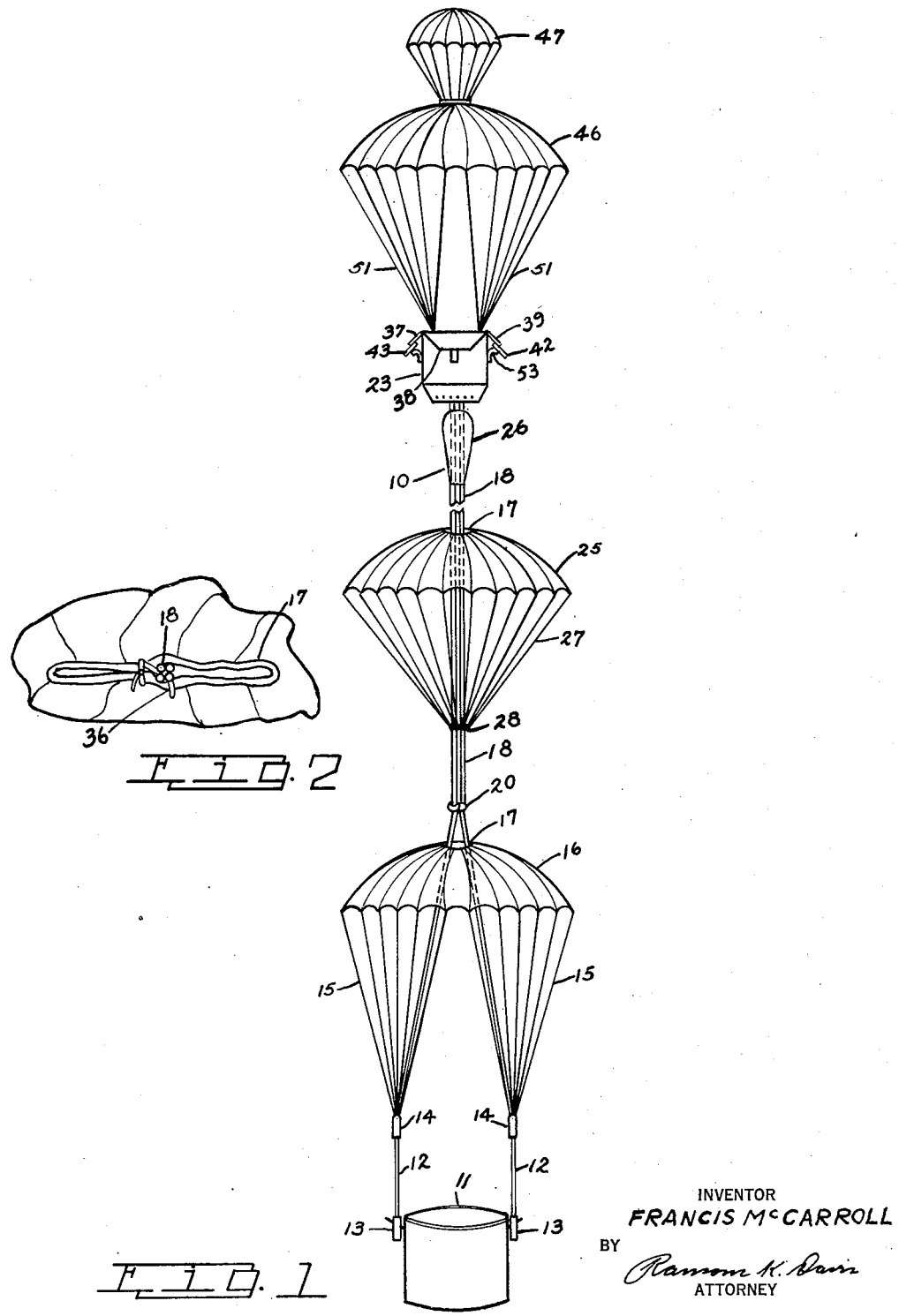
INVENTOR
FRANCIS McCARROLL
BY
Ransom K. Davis
ATTORNEY

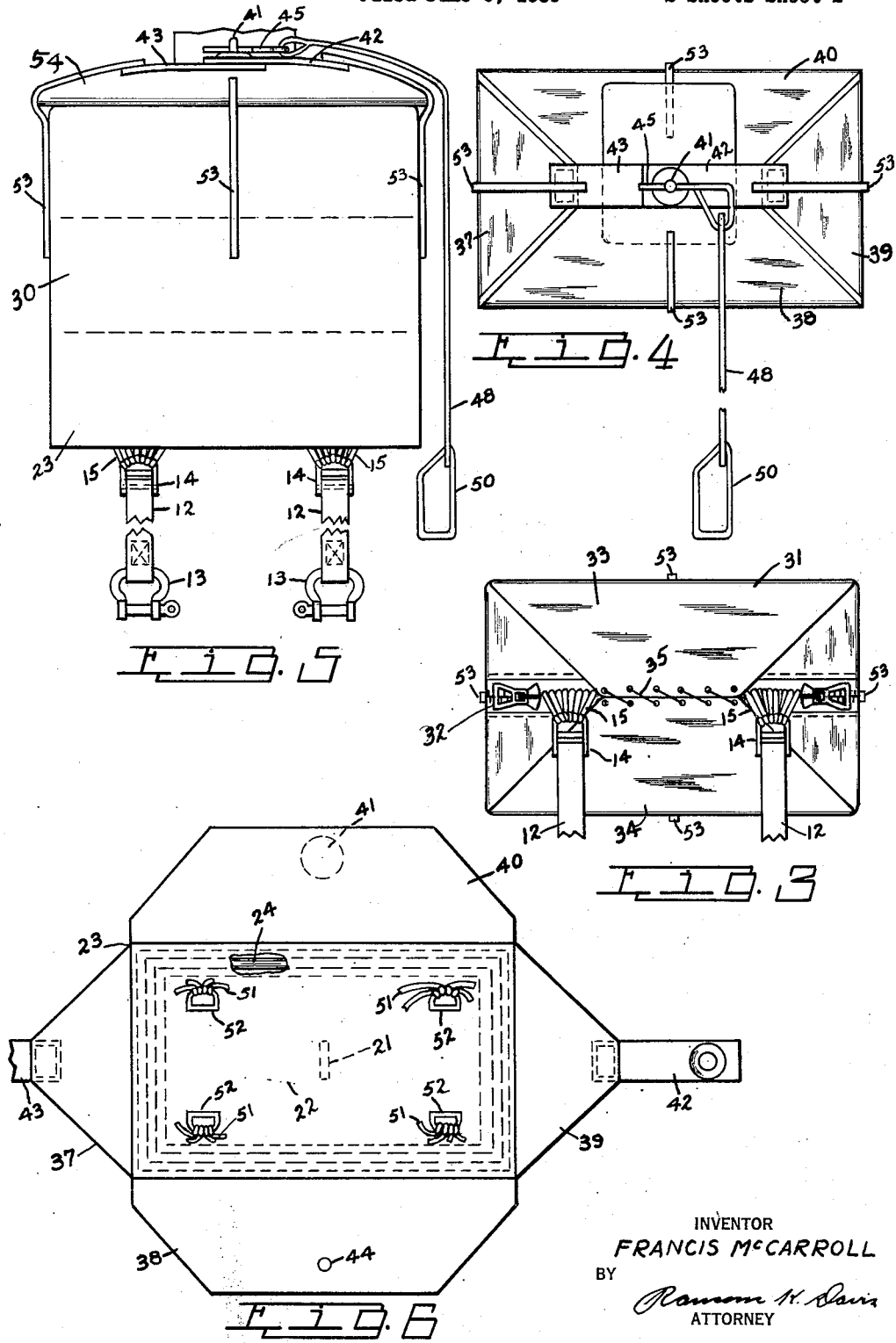

Patented July 9, 1940

2,206,910

UNITED STATES PATENT OFFICE 2,206,910

HEAVY LOAD PARACHUTE DEVICE

Francis McCarroll, Lakehurst, N. J.

Application June 5, 1939, Serial No. 277,466

6 Claims. (Cl. 244—142)

(Granted under the act of March 3, 1883, as amended April 30, 1928; 370 O. G. 757)

This invention relates to heavy load parachutes and has for an object to provide an improved parachute device capable of supporting and lowering heavy loads at a safe rate of descent.

A further object of this invention is to provide a parachute device capable of lowering a heavy load, such as the dropping of heavy supplies, provisions, munitions, armament or other objects from aircraft in relief rescue or combat operations without the objectionable feature of oscillation present in varying degree in most types of individual parachutes and which would especially be present in a single parachute of sufficient area to support and lower the heavy loads capable of being carried by the present invention. A parachute made according to prior art would be 75 to 100 ft. in diameter in order to carry a load capable of being carried by the parachute device of the present invention. With such a large parachute a tremendous oscillation or pendulum effect would be present, and even though the load were lowered at a slow rate, it would probably be severely damaged by striking the surface of the earth as it oscillates.

A further object of this invention is to provide a parachute device which will include a plurality of individual tandem parachutes and in which the carrying capacity of the parachute may be increased by increasing the number of tandem parachutes present, thus either decreasing the rate of descent or increasing the load supporting capacity, or both.

With the foregoing and other objects in view, the invention consists in the construction, combination and arrangement of parts as will be described more fully hereafter.

Fig. 1 is an elevational view of the parachute device of this invention in operation;

Fig. 2 is a fragmentary view of the center whole section of one of the tandem parachutes before it has opened;

Fig. 3 is a bottom plane view of the parachute pack in closed position;

Fig. 4 is a top plane view of the parachute pack;

Fig. 5 is a side plane view of the parachute pack, and

Fig. 6 is a bottom plane view of the parachute pack in open position.

There is shown at 10 the parachute device of this invention especially intended for carrying and safely lowering heavy loads at a slow rate of descent. The heavy load may be carried in a basket such as 11, supported at opposite sides by straps 12 and attached thereto by D rings 13. Attached to the upper ends of straps 12 buckles 14 to which are secured shroud lines 15 that are secured to the edges of the lowermost tandem parachute 16. This tandem parachute 16 with the shroud lines 15 as well as each of the additional tandem parachutes forming part of this parachute device may be of the conventional man supporting parachute type and of the size of from 24 to 28 ft. more or less in diameter and provided with the usual central air aperture 17. Also secured to each of the buckles 14 are two pairs of strands forming a load line 18, which strands are secured together at intervals along their length as at 20. The four load line strands 18 are all secured to an anchoring ring 21, secured to the canvas roof 22 of the parachute pack 23. This canvas roof is provided with a rectangular reinforcing frame 24. Between this canvas roof 22 and the lowermost tandem parachute 16 are secured a plurality of additional parachutes 25 and 26, the latter of which is shown in not yet opened position and, if it is desired, still more additional parachutes may be secured in a similar manner.

Tandem parachutes 16, 25 and 26 are all packed within the main compartment 30 of the parachute pack 23 with the straps 12 extending through the bottom 31 are shown in Fig. 3. The side walls of this main compartment 30 may be held closed by hookless fasteners 32, commonly known as zippers. After the parachute is packed therein, flaps 33 and 34 of the main compartment 30 are held together by means of frangible rip threads 35 to close the compartment 30. In order to enable the tandem parachutes to be packed into the main compartment 30 more easily, they will be stretched along the load line 18 and lightly secured thereto by a frangible rip thread 36 sewed across the hem of the opening 17 and to the load line 18.

A pilot compartment 54 is formed by the top of the main compartment roof 22 and the four flaps 37, 38, 39 and 40. One of these flaps, as 40, is provided with a transversely apertured stud 41 over which is placed aperture 44 of the opposite flap 38. Then apertured tapes 42 and 43 extending from flaps 37 and 39 are placed over the stud 41 and a rip cord pin 45 is put through the transverse aperture in stud 41 to hold the compartment closed, with a main pilot chute 46 and sub-pilot chute 47 packed therein. A rip cord 48 and rip cord handle 50 are provided for removing the rip cord pin 45 and allowing the pilot chutes to be exposed to the airstream and be opened.

Sub-pilot chute 47 is attached to main pilot chute in the customary manner. Main pilot chute 46 may be of the same load sustaining size as the tandem chutes, and is secured by its shrouds 51 to the four D rings 52 fastened to the top of main compartment roof 22.

In operation, the load to be dropped from the aircraft is placed in basket 11 or otherwise secured to straps 12, the number of tandem parachutes being used depending on the weight of the load. When the load is dropped, the handle 50 is either held by the operator or fastened to the aircraft, the pin 45 is withdrawn, releasing the flaps 37 to 40 of the pilot compartment, allowing the flaps to be drawn back in the customary manner by the elastic cords 53. The sub-pilot chute 47 is caught in the airstream and pulls out the main pilot chute 46. When main pilot chute 46 opens, it checks the descent of the pack 23, while the load pulls on the straps 12, breaking the rip threads 35 and stretching out the load lines 18, exposing the tandem chutes 16, 25 and 26, to the airstream, causing them to break the rip threads 36 and open to the supporting position. With the number of tandem chutes increased as desired, the only limit on the weight of the load that can be safely dropped is the strength of the load lines 18 and the carrying capacity of the aircraft. Also the rate of descent for even heavier loads may be decreased as desired by increasing the number of tandem chutes accordingly.

According to the provisions of the patent statutes, I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A parachute container pack including a main compartment and a pilot chute compartment, a load line anchored to said pack, a series of tandem parachutes attached to said load line, frangible means holding said series of parachutes in said main compartment, a main pilot chute within said pilot compartment and parachute rip cord means for opening said pilot chute compartment.

2. A parachute container pack including a main compartment and a pilot chute compartment, a load line anchored to said pack, a series of tandem parachutes attached to said load line, frangible means holding said series of parachutes in said main compartment, a main pilot chute within said pilot compartment and parachute rip cord means for opening said pilot chute compartment, a sub-pilot chute attached to said main pilot chute to withdraw said main pilot chute to sustaining position, said main pilot chute being of load sustaining size to cause said frangible means on said main compartment to break and allow ejection of said series of parachutes.

3. A heavy load parachute device comprising a load supporting line, a series of tandem parachutes, and an individual series of shroud lines depending from each of said tandem parachutes, each individual series of shroud lines providing the sole attachment between its individual parachute and said load line.

4. A heavy load parachute device comprising a load supporting line, a series of tandem parachutes of substantially equal size, and an individual series of shroud lines depending from each of said tandem parachutes, each individual series of shroud lines providing the sole attachment between its individual parachute and said line.

5. A heavy load parachute device comprising a load supporting line, a series of tandem parachutes each having a central air aperture therein, and an individual series of shroud lines depending from each of said tandem parachutes, each individual series of shroud lines providing the sole attachment between its individual parachute and said load line, said load line extending freely through the central air aperture of each parachute of said series in load sustaining position.

6. A heavy load parachute device comprising a load supporting line, a series of tandem parachutes each having a central air aperture therein, and an individual series of shroud lines depending from each of said tandem parachutes, each individual series of shroud lines providing the sole attachment between its individual parachute and said load line, frangible means holding each parachute in extended position along said load line prior to opening to load sustaining position, said load line extending freely through the central air aperture of each parachute of said series in load sustaining position.

FRANCIS McCARROLL.